US011811764B2

(12) United States Patent
Rose et al.

(10) Patent No.: US 11,811,764 B2
(45) Date of Patent: Nov. 7, 2023

(54) CLASSIFYING TYPES OF SENSITIVE EVENTS FOR DATA LOSS PREVENTION

(71) Applicant: TRUIST BANK, Winston-Salem, NC (US)

(72) Inventors: Amy Rose, Chapel Hill, NC (US); Justin Dubs, Raleigh, NC (US); Joseph Aguayo, Fuquay Varina, NC (US)

(73) Assignee: Truist Bank, Charlotte, NC (US)

( * ) Notice: Subject to any disclaimer, the term of this patent is extended or adjusted under 35 U.S.C. 154(b) by 429 days.

(21) Appl. No.: 16/746,217

(22) Filed: Jan. 17, 2020

(65) Prior Publication Data

US 2021/0226953 A1 Jul. 22, 2021

(51) Int. Cl.
*G06F 40/117* (2020.01)
*H04L 9/40* (2022.01)
*G06Q 10/107* (2023.01)
*G06F 40/289* (2020.01)
*G06N 20/00* (2019.01)

(52) U.S. Cl.
CPC ............ *H04L 63/10* (2013.01); *G06F 40/117* (2020.01); *G06F 40/289* (2020.01); *G06N 20/00* (2019.01); *G06Q 10/107* (2013.01)

(58) Field of Classification Search
CPC ..... G06F 40/289; G06F 40/117; G06N 20/00; H04L 63/10; G06Q 10/107
See application file for complete search history.

(56) References Cited

U.S. PATENT DOCUMENTS

| 10,834,127 | B1* | 11/2020 | Yeh .................... G06N 20/00 |
| 11,106,994 | B1* | 8/2021 | Batalov ................ G06N 5/04 |
| 2009/0113542 | A1* | 4/2009 | Price .................... H04L 63/20 |
| | | | 726/15 |
| 2015/0135271 | A1* | 5/2015 | Forest ............... H04L 12/40032 |
| | | | 726/4 |
| 2015/0271153 | A1* | 9/2015 | Rohloff ............... H04L 63/0471 |
| | | | 713/153 |
| 2018/0060302 | A1* | 3/2018 | Liang ..................... G06F 16/35 |
| 2019/0324879 | A1* | 10/2019 | Abraham .............. G06F 11/302 |

* cited by examiner

*Primary Examiner* — Kyle R Stork
(74) *Attorney, Agent, or Firm* — Kilpatrick Townsend & Stockton LLP; Michael A. Springs, Esq.

(57) ABSTRACT

Identification of an electronic communication containing specific information is provided. Content of the electronic communication may be evaluated by a machine-learning model, and based on an evaluation of the content, it may be determined that the electronic communication contains the specific information. The electronic communication may be tagged with tag information indicating that the electronic communication contains the specific information, and transmission of the electronic communication may be blocked based on the tag information.

17 Claims, 4 Drawing Sheets

CLASSIFYING TYPES OF SENSITIVE EVENTS FOR DATA LOSS PREVENTION

TECHNICAL FIELD

The present disclosure relates to data loss prevention and more particularly, though not necessarily exclusively, to automatically identifying and tagging documents containing sensitive information.

BACKGROUND

Data loss prevention (DLP) is a strategy for ensuring that end users do not send sensitive or critical information outside an organization's computer network. DLP may include a set of tools and processes used to ensure that sensitive data is not lost, misused, or accessed by unauthorized users. DLP software may classify regulated, confidential, and business critical data, and identify violations of policies defined by organizations or driven by regulatory compliance such as Health Insurance Portability and Accountability Act (HIPAA), Payment Card Industry Data Security Standard (PCI DSS), or General Data Protection Regulation (GDPR). Current data loss prevention solutions are manual and rely on formatting of data (for example, social security numbers) to protect information from being sent outside of an organization. These manual solutions may not protect against employees sending out other types of sensitive information.

SUMMARY

In one example, a computer-implemented method may include evaluating the content of an electronic communication for specific information by a machine-learning model. Based on an evaluation of the content, it may be determined that the electronic communication contains the specific information. In response to determining that the electronic communication contains the specific information, the electronic communication may be tagged with tag information indicating that the electronic communication contains the specific information. The electronic communication may be tagged when the machine-learning model identifies a predetermined number of words or phrases related to the specific information. Based on the tag information, transmission of the electronic communication may be blocked.

In a another example, a computer system may include a network, a plurality of first computing devices connected to the network and configured to transmit and receive electronic communications, and a second computing device connected to the network. The second computing device may be configured to execute a machine-learning model to evaluate content of the electronic communication, and determine, based on an evaluation of the content, that the electronic communication contains specified information. The second computing device may be further configured to tag the electronic communication with tag information indicating that the electronic communication contains the specified information based on the machine-learning model identifying a predetermined number of words or phrases related to the specific information, and block transmission of the electronic communication based on the tag information.

In a further example, a non-transitory computer readable medium may include instructions for causing one or more processors to perform operations including evaluating, by a machine-learning model, content of the electronic communication for specific information, and determining, based on an evaluation of the content, that the electronic communication contains the specific information. In response to determining that the electronic communication contains the specific information, the operations may include tagging the electronic communication with tag information indicating that the electronic communication contains the specific information based on the machine-learning model identifying a predetermined number of words or phrases related to the specific information, and blocking transmission of the electronic communication based on the tag information.

DETAILED DESCRIPTION

Figure 1:
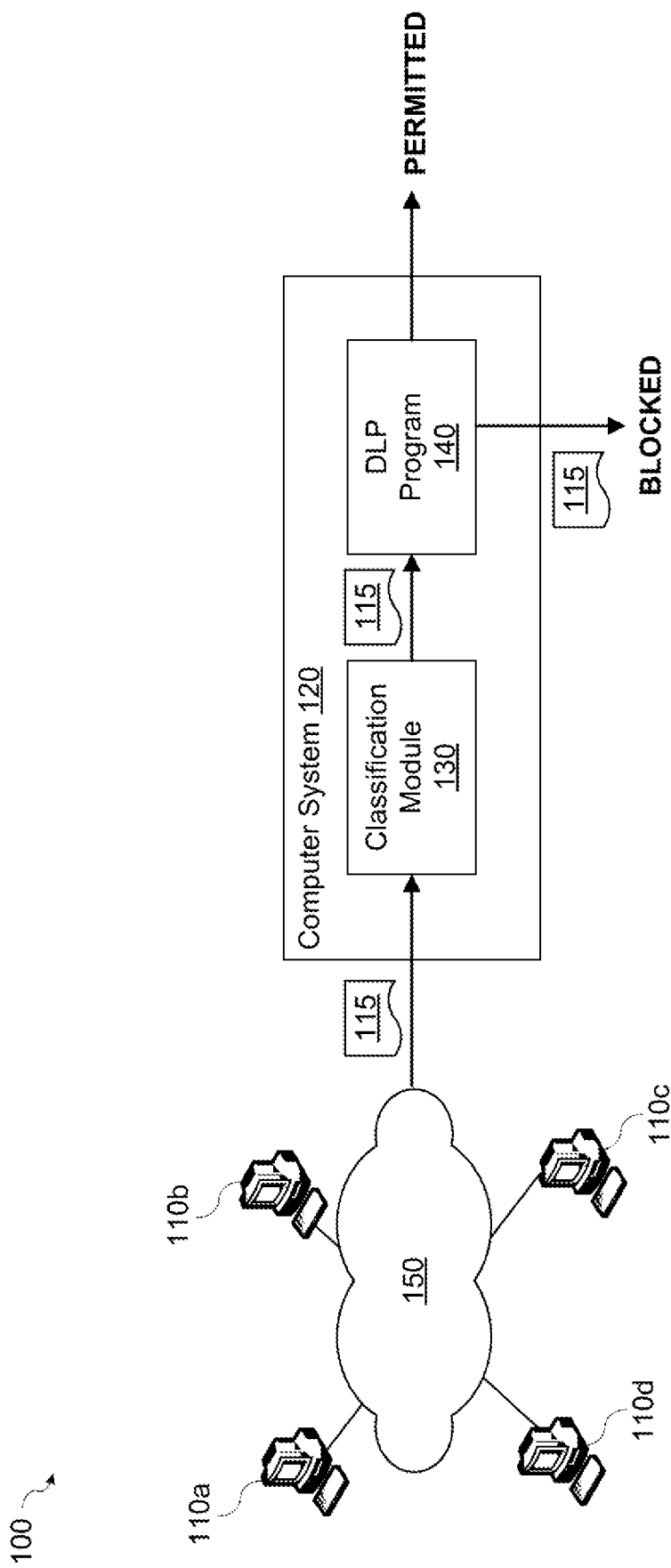
FIG. 1 is a diagram illustrating an example of a computer system including a classification module and a DLP program according to some aspects of the present disclosure.

Certain aspects and features relate to identifying sensitive information in communications by using a system that can continuously adjust to the type of information that may be considered sensitive based on assessing historical communications. Such a system can prevent the communications from leaving a secure network for a less secure network. And sensitive information in non-standardized format can be detected and communications containing the sensitive information in the non-standardized format can be delayed or prevented from being transmitted from the secure network. By using certain aspects of the present disclosure, an information security system can dynamically update and apply controls to sensitive information that may not have been sensitive historically but is sensitive in a current time.

Data loss prevention (DLP) tools and processes are often successful, but only with respect to highly formatted information because the tools and processes are limited to identifying secure data that is in a particular format. Examples of highly formatted information can include social security numbers and credit card numbers. DLP tools and processes may not be able to examine incoming or outgoing information and contextualize it to determine whether the information should be permitted to enter or leave the network. Determining the sensitivity of the information based on context is typically a manual process. Some examples of the present disclosure may employ technologies such as artificial intelligence to determine the types of information in a communication entering or leaving a network and to tag the communication to enable the communication to be identified as containing sensitive information by a DLP program. Sensitive information in privileged communications, such as attorney-client privileged communications, or in communications from heavily regulated industries, such as health care and securities, can be identified and classified before being approved to be sent out of a network.

According to some aspects of the present disclosure, electronically stored historical employee electronic communications may be used to identify patterns of words and phrases that identify classes of specified events. Examples of electronically stored historical employee electronic communications can include email, collaboration application communications, and text messages. The classes of specified events may include sensitive events for a corporation, such as mergers, lawsuits, and potential scandals. The electronically stored data can be gathered from company databases, archives, and other data stores or can be publicly accessible data from other companies. Artificial intelligence (AI) may be used to identify specified or sensitive event-related words and phrases in the employee electronic communications and publicly accessible data that can subsequently be used to classify and tag current electronic communications. The terms "specified" and "sensitive" are used interchangeably to indicate events or information that a company may want to prevent leaving the network.

In some situations, information may move between networks. One network may be a high security network for operating on sensitive information as well as non-sensitive information. Another network may be a lower security network used for typical processing operations on non-sensitive information. In such situations, processes may be needed to prevent transfer of sensitive information such as passwords from the high security network to the lower security network, while still permitting transfers of non-sensitive information between the networks.

Data classification systems may be implemented to classify electronic communications. For example, when sending out an email, the email can be manually tagged with a classification indicating the sensitivity of the email. This type of data classification system can be highly subjective. An email sent by a user on one day may be tagged with a different classification than a similar email sent by the same user on a different day based on various factors that can affect the user's perception of the sensitivity of the information contained in the email.

Some aspects of the present disclosure may automatically classify information and prevent sensitive information from being transmitted from an organization's network. Automatically classifying the information may provide a more granular ability to detect information that may be sensitive but may not follow a particular identifiable format, such as a social security number, a credit card number, etc. Sensitive information may be identified based on, for example, common attributes in a particular area of phraseology, and blocked from leaving a network, for example, leaving the organization's network or leaving a subnet of the organization's network.

The classification may be tunable. For example, if information regarding a merger between Company A and Company B is considered sensitive, a machine-learning algorithm may be trained using electronic communications related to the merger from internal collaboration sites (e.g., SharePoint), shared workspaces, document libraries, etc., to create a signature for merger related documents. Outbound electronic communications, for example, but not limited to, emails, may then be scanned using the machine-learning algorithm to identify and block emails containing the signature for merger related documents from leaving the network.

Some examples according to the present disclosure may provide a classification module configured to identify classes of sensitive information and tag electronic communications containing the identified classes of sensitive information. FIG. 1 is a diagram illustrating an example of a computer system including a classification module and a DLP program according to aspects of the present disclosure.

Referring to FIG. 1, one or more user computer systems 110*a*-110*d* may be connected to a network 150, for example, an organization's network. An administrator computer system 120 may be connected to the network 150 to monitor electronic communications entering and leaving the network 150. The administrator computer system 120 may be for example, a computer system monitored by a system administrator, a server, or other computer system. In some implementations, the administrator computer system 120 may be configured to receive electronic communications prior to the electronic communications entering the network 150, leaving the network 150, or both entering and leaving the network 150.

The administrator computer system 120 may include a classification module 130 and may execute a DLP program 140. In some implementations, the DLP program may be executed by a different computer system. The classification module 130 may be configured to identify sensitive event-related words and phrases in an electronic communication 115 transmitted from the user computer systems 110*a*-110*d* over the network 150 that are addressed outside of the network 150. When sensitive event-related words or phrases are identified, the electronic communication 115 may be tagged with an appropriate classification by the classification module 130. For example, the classification module may mark a communication with a tag indicating that the electronic communication 115 contains sensitive information related to a particular category (e.g., merger, lawsuit, scandal, etc.) defined as being of importance to an organization.

The DLP program 140 may subsequently operate to recognize the tag on the electronic communication 115 as indicating that the electronic communication 115 contains sensitive information having a particular classification. The DLP program 140 may then block the tagged electronic communication 115 from leaving the network. In cases where an electronic communication is not tagged as containing sensitive information that should be prevented from leaving the network, the DLP program 140 may permit transmission of the electronic communication outside of the network 150.

The classification module may utilize artificial intelligence (AI), for example a machine-learning algorithm or model, to evaluate the contents of the electronic communication to determine whether the electronic communication contains sensitive information. For example, the machine-learning algorithm or model may be trained using stored historical employee communications to identify patterns of words and phrases that identify classes of sensitive events (e.g., the merger example). The historical employee communications may include email, collaboration application communications, and text messages. The machine-learning algorithm or model may evaluate words or phrases in the content of the electronic communication to enable classification and categorization of the electronic communication as containing sensitive information in one or more identified categories. The machine-learning algorithm or model may identify and classify information that does not follow a commonly identifiable format such as a social security number of a credit card number that is contained in the electronic communication.

Machine-learning models or algorithms may be developed to detect sensitive information in various categories. For example, a merger category may include a collection of past emails and other communications containing words and phrases related to mergers from an organization negotiating a merger. The machine-learning algorithm may be trained with words or phrase patterns related to the merger in the emails. Current emails and other communications may then be scanned to identify matching patterns, and when a matching pattern is identified, the email or communication may be tagged as containing sensitive information related to a merger. A DLP program may detect the tag and block the email or communication from being sent. Alternatively or additionally, the DLP program may provide a notification regarding the email or communication to a user, for example, a system administrator, and the user may decide whether to block or allow sending of the email or other communication.

As another example, the classification module may implement a lawsuit category using historical communications generated before a company was sued that contain words and phrases related to the lawsuit. In addition, public data containing emails and communications related to lawsuits may be available. The machine-learning algorithm may be trained with words or phrase patterns related to lawsuits in the emails and communications, and current emails and communications scanned and tagged when matching patterns are identified. A DLP program may evaluate the tags and prevent the tagged information from leaving the organization.

The classification module may implement the various models or algorithms to detect sensitive information in different categories. In some cases, one machine-learning model or algorithm may be executed during specific time periods to identify sensitive information in a specific category. For example, if the company believes that a lawsuit is imminent, a machine-learning model or algorithm trained to detect information related to lawsuits may be executed to scan the electronic communications. In some cases, a combination of machine-learning models or algorithms for various categories may be executed. In some implementations, any or all machine-learning models or algorithms may be continually executed to constantly monitor electronic communications.

In various situations, words or phrases that may not have appeared often in past communications may begin to appear somewhat frequently. The sudden appearance of the words or phrases may be one factor to indicating that the subject matter of the words or phrases may be an area in which a particular tag should be applied.

In some implementations, the classification module may utilize a term frequency-inverse document frequency (TF-IDF) algorithm to identify words or phrase patterns indicating sensitive information. The algorithm can pick out unique or unusual words. The TF-IDF algorithm determines the frequency of occurrence of terms occur within a single document and also the frequency of occurrence of the terms within all the other documents. In this way, the algorithm looks for rare words across a large group of documents. For example, if the term "trust" is an important word for identifying sensitive information, the algorithm may search for the word "trust" and identify that it does not occur in any documents before a certain date, but then frequently occurs, thereby identifying documents potentially containing sensitive information.

In some implementations, the classification module may utilize engrams to identify words or phrase patterns indicating sensitive information. Engrams are small clusters of text, for example, groups of three words, groups of five words, etc., that occur in combination with each other. Using an uncommon engram, for example, the term "merger of equals," documents may be scanned. The engram may only start to appear in documents generated after a certain date. The documents in which the engram appears may be tagged as being correlated with sensitive merger related activity and may subsequently be identified and blocked by a DLP program.

In some implementations, the classification module may utilize a support vector machine. A support vector machine (SVM) analyzes data and assigns the data to one of two categories. The SVM may be trained using two sets of documents. A first set of documents may be associated with correctly characterized and categorized sensitive information. Common phrases or words related to the sensitive information may be identified, and a second, uncharacterized set of documents may be tested using the common phrases or words to identify documents that should be included in the first set of documents. Other methods of identifying classes of sensitive information, for example, but not limited to, neural networks, may be implemented by the classification module without departing from the scope of the present disclosure.

The classification module may implement a configurable threshold based on, for example a number or percentage of matching words or phrases or both. The configurable threshold may define an acceptable number of false positives for various classifications of sensitive information. For example, for communications containing information classified as highly sensitive, a user may be willing to accept more false positives classifications to prevent the highly sensitive information from leaving the network. False positive classifications are communications tagged as highly sensitive but not containing highly sensitive information. A lower threshold for matching words and phrases may be set to capture more communications.

In some implementations, the classification module may assign a confidence score when a communication is tagged. The confidence score may indicate a degree of confidence that the tagged communication includes the type of sensitive information indicated by the tag. The confidence score may be utilized by a DLP program to determine an action to be taken with the tagged communication. For example, if a tagged communication has a confidence score below a certain threshold, the DLP program may determine that the communication may be sent out of the network.

The confidence score may be adjustable. For example, if a communication is tagged with a 25% confidence score that the communication contains information related to a particular category based on the presence of certain words and phrases, and it is important that information related to the particular category does not leave the network, the DLP program may be configured to block any communication containing information related to the particular category tagged with a lower confidence score, for example, greater than 15%. Conversely, if it is determined to be less important to block communications containing information related to the particular category, the DLP program may be configured to block communications containing information related to the particular category with a higher confidence score, for example, greater than 75%.

In some cases, the recipient of the communication may be used, at least in part, to identify communications that may contain sensitive information. The identity of the recipient may be used to modify the confidence score. For example, the classification module may determine with a 40% confidence score that a communication contains sensitive information, for example, information regarding a merger between two companies. If the recipient of the communication is identified as a CEO of one of the companies, the confidence score may be increased closer to a score of 100% confidence that the communication contains sensitive merger-related information and may be tagged accordingly.

In accordance with aspects of the present disclosure, various categories of machine-learning models of sensitive information may be developed. For example, machine-learning models for a merger category, a lawsuit category, a scandal category, etc., may be developed using types of documentation related to the various categories. The various models may be implemented by the classification module as desired. For example, if the company CEO knows that early stages of a merger negotiation with another company are beginning, the company DLP group may be instructed to implement the merger model.

Alternatively, all the previously developed models may be implemented to identify a spectrum of important sensitive information. Communications may be scanned by the classification module for all of the specified sensitive information and tagged accordingly. A DLP program may then block or permit sending of the tagged communications based on, for example, either the threshold of matching words and phrases or the confidence score or both. In some cases, the DLP program may send a warning or other indication to the sender that the communication contains sensitive information and should not be sent.

Aspects of the present embodiments are not limited to scanning emails being sent over a network. Any type of electronic communication may be scanned using embodiments of the present disclosure to identify and tag sensitive information. Further, any information that may potentially leave the network by any means, for example, but not limited to, a universal serial bus (USB) memory stick or other portable memory device, may be scanned for sensitive information, tagged accordingly, and either be blocked from leaving the network or permitted to leave the network.

Figure 2:
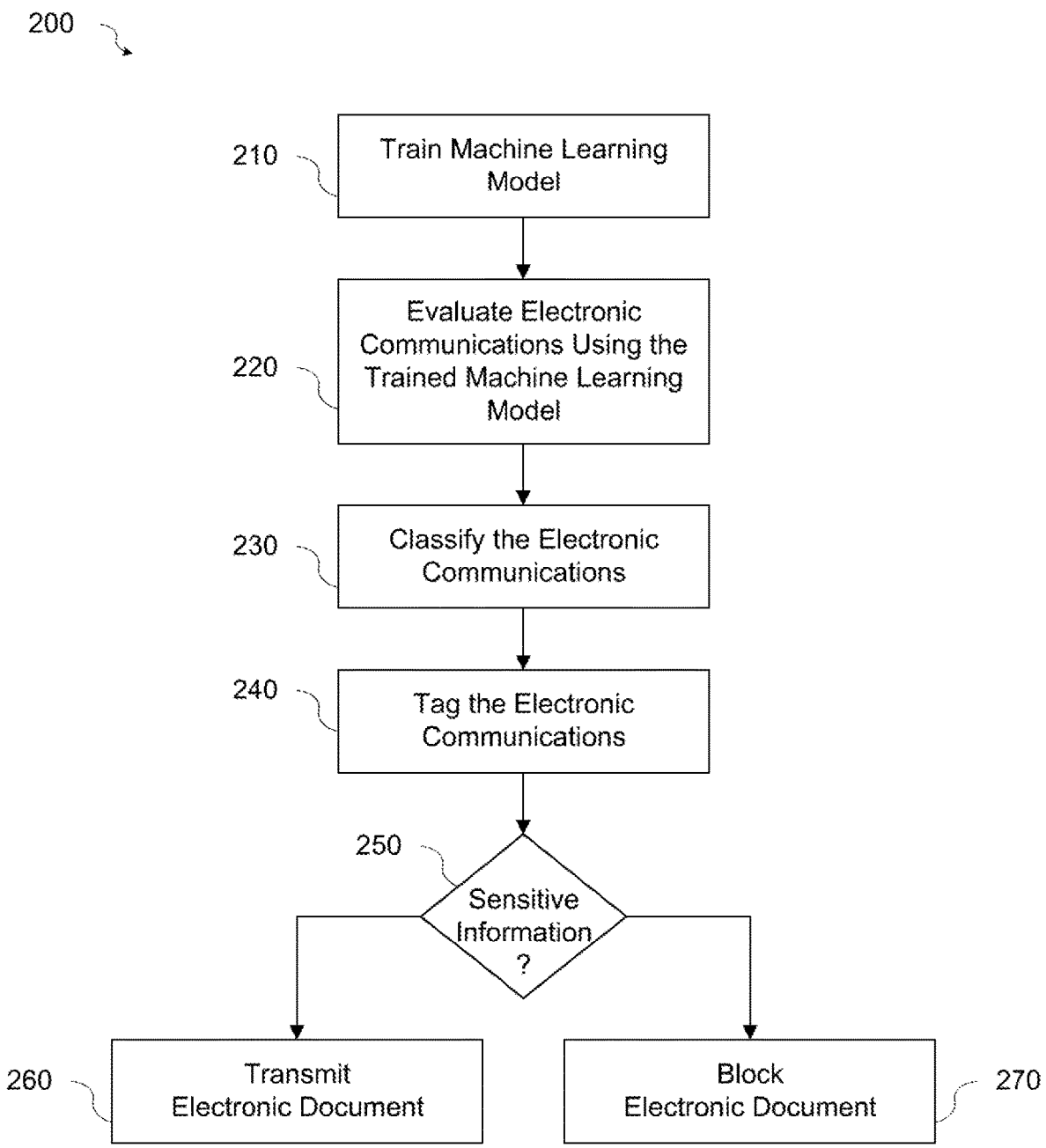
FIG. 2 is a flowchart illustrating an example of a process for classifying and tagging sensitive information according to some aspects of the present disclosure.

FIG. 2 is a flowchart illustrating a method 200 for classifying and tagging sensitive information according to aspects of the present disclosure. Referring to FIG. 2, at block 210, a machine-learning model may be trained. The classification module may utilize AI, for example a machine-learning algorithm or model, that may be trained using stored historical employee communications such as email, collaboration application communications, and text messages to identify patterns of words and phrases that identify classes of sensitive events.

In some implementations, the classification module may utilize a term frequency-inverse document frequency (TF-IDF) algorithm to identify words or phrase patterns indicating sensitive information. The algorithm can pick out unique or unusual words. The TF-IDF algorithm determines the frequency of occurrence of terms occur within a single document and also the frequency of occurrence of the terms within all the other documents. In some implementations, the classification module may utilize engrams to identify words or phrase patterns indicating sensitive information.

In some implementations, the classification module may utilize a support vector machine. A support vector machine analyzes data and assigns the data to one of two categories. Other methods of identifying classes of sensitive information, for example, but not limited to, neural networks, may be implemented by the classification module without departing from the scope of the present disclosure.

At block 220, electronic communications may be evaluated by the machine-learning model. Computer systems connected to a network, for example, computer systems 110a-110d connected to the network 150 as illustrated and described with respect to FIG. 1, may generate electronic communications. The electronic communications generated by the computer systems may be addressed to recipients outside of the network. In some cases, the electronic communications may contain sensitive information that should not leave the network. The electronic communications may be evaluated by the classification module, for example, the classification module 130 as illustrated and described with respect to FIG. 1, to identify sensitive information contained in the electronic communications. A machine-learning model or algorithm may evaluate the contents of the electronic communication to determine whether the electronic communication contains sensitive information.

The classification module may implement the various models or algorithms to detect sensitive information in different categories. In some cases, one machine-learning model or algorithm may be executed during specific time periods to identify sensitive information in a specific category. In some cases, a combination of machine-learning models or algorithms for various categories may be executed. In some implementations, any or all machine-learning models or algorithms may be continually executed to constantly monitor electronic communications.

At block 230, the electronic communications may be classified. The machine-learning algorithm or model may evaluate words or phrases in the context of the electronic communication to enable classification of the electronic communication as containing sensitive information in one or more identified categories. The classification module may implement various categories of information such as merger, lawsuit, and scandal that may contain sensitive information.

At block 240, the classified electronic communications may be tagged. When the classification module determines that an electronic communication may contain sensitive information, the classification module may tag the electronic communication to indicate the potential presence of the sensitive information. The classification module may implement a configurable threshold based on, for example a number or percentage of matching words or phrases or both. The configurable threshold may define an acceptable number of false positives for various classifications of sensitive information.

In addition to indicating that the electronic communication may contain sensitive information, the tag may also include a confidence score indicating a degree of confidence that the tagged communication includes the type of sensitive information indicated by the tag. The confidence score may be utilized by a DLP program to determine an action to be taken with the tagged communication.

At block 250, it may be determined whether the tags indicate that an electronic document contains sensitive information. For example, a DLP program may examine the tags on the electronic communications. In addition to identifying a tag that indicates an electronic communication may contain sensitive information, the DLP program may consider the confidence score in determining the disposition of the electronic communication.

In response to determining that the tag does not indicate the electronic communication contains sensitive information (block 250-N), at block 260, the electronic document may be transmitted from the network. For example, the DLP program may identify a tag indicating that the electronic communication may contain sensitive information, but the confidence score may be below a specified threshold. Therefore, the DLP program may permit the electronic communication to be transmitted.

In response to determining that the tag indicates the electronic document contains sensitive information (block 250-Y), at block 270, the electronic document may be blocked from being transmitted from the network. For example, the DLP program may identify a tag indicating that the electronic communication may contain sensitive information, and the confidence score may meet or exceed a specified threshold. Therefore, the DLP program may block the electronic communication from being transmitted. In some implementations, a notification may be sent to a user, for example, a system administrator, that an electronic communication has been blocked.

The specific steps illustrated in FIG. 2 provide a particular methods for classifying and tagging sensitive information according to embodiments of the present disclosure. Other sequences of steps may also be performed according to alternative embodiments. For example, alternative embodiments may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. Many variations, modifications, and alternatives are possible.

Figure 3:
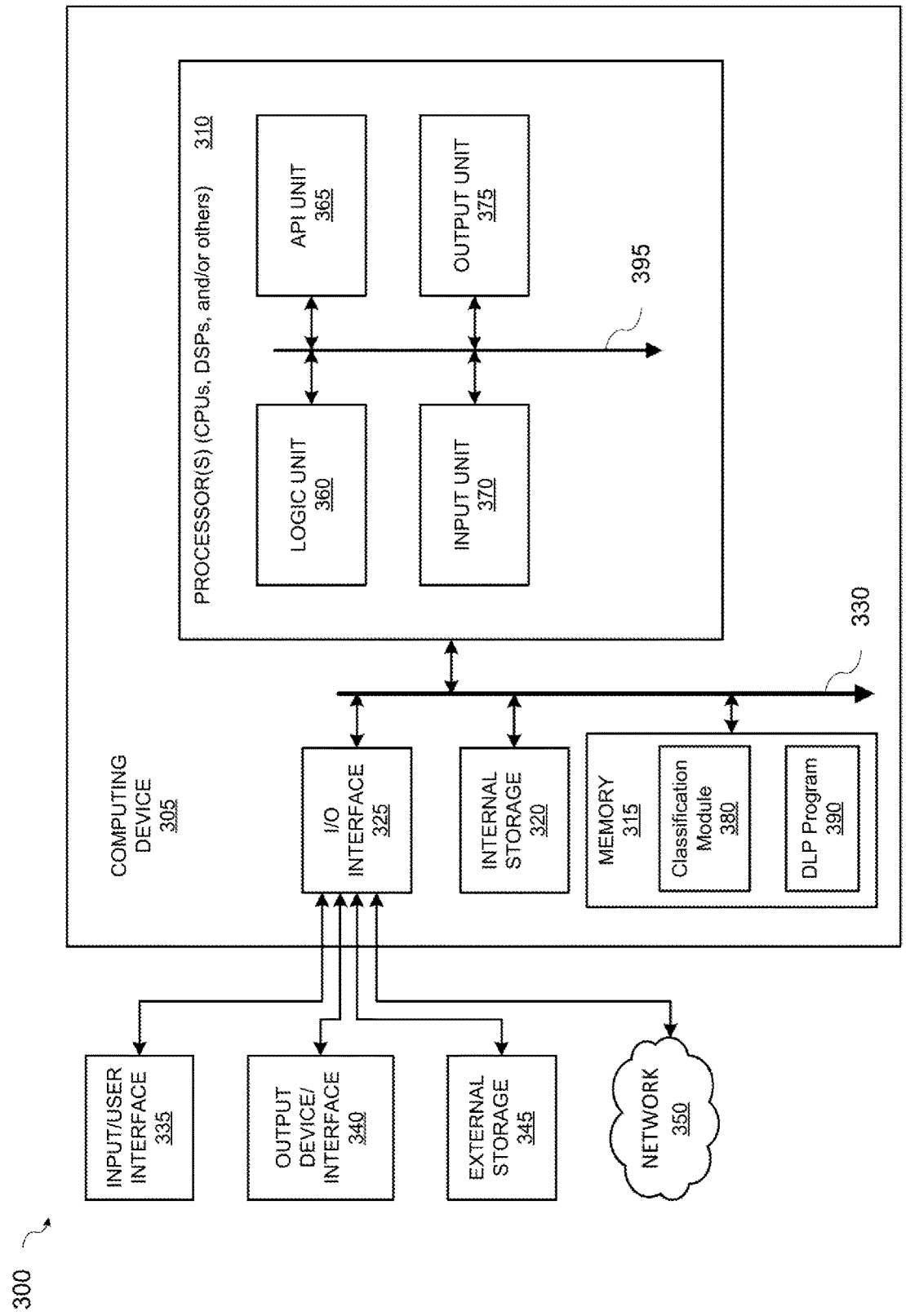
FIG. 3 is a block diagram of an example computing environment with an example of a computing device suitable for implementing a DLP program according to some aspects of the present disclosure.

The method 200 may be embodied on a non-transitory computer readable medium, for example, but not limited to, a memory of computer system 120 or computing device 305 as described with respect to FIG. 3 or other non-transitory computer readable medium, having stored therein a program including computer executable instructions for making a processor, computer, or other programmable device execute the operations of the method.

FIG. 3 is a block diagram of an example computing environment 300 with an example of a computing device 305 suitable for implementing a DLP program according to some aspects of the present disclosure. In accordance with aspects of the present disclosure, the classification module and the DLP program may execute on the computing device 305.

The computing device 305 in the computing environment 300 may include one or more processing units, cores, or processors 310, memory 315, internal storage 320, and I/O interface 325, any of which may be coupled on a communication mechanism or a bus 330 for communicating information or embedded in the computing device 305. Memory 315 may include RAM and ROM, as well as other memory. Internal storage 320 may include magnetic storage, optical storage, solid state storage, organic storage, or combinations thereof. Instructions for implementing a classification module 380 and instructions for executing a DLP program 390 may be stored in memory 315 and executed by processors 310. In some implementations, the classification module and the DLP program may be implemented on different computer systems.

The computing device 305 may be communicatively coupled to an input/user interface 335 and an output device/interface 340. Either one or both of the input/user interface 335 and the output device/interface 340 may be a wired or wireless interface. The input/user interface 335 may include any device, component, sensor, or interface, physical or virtual, that can be used to provide input, including buttons, touch-screen interface, keyboard, a pointing/cursor control, microphone, camera, and/or the like. The output device/interface 340 may include a display, television, monitor, printer, speaker, or the like. In some example implementations, the input/user interface 335 and the output device/interface 340 may be embedded with or physically coupled to the computing device 305. Examples of the computing device 305 may include, but are not limited to, mobile devices such as tablets, notebooks, laptops, personal computers, portable televisions, and radios, and devices not designed for mobility such as desktop computers.

The computing device 305 may be communicatively coupled via the I/O interface 325 to an external storage device 345, a network 350 for communicating with any number of networked components, devices, and systems, including one or more computing devices of the same or different configuration, etc. The computing device 305 or any connected computing device may be functioning as, providing services of, or referred to as a server, client, thin server, general machine, special-purpose machine, or another label.

The I/O interface 325 may include, but is not limited to, wired and/or wireless interfaces using any communication or I/O protocols or standards such as Ethernet, 802.11x, Universal System Bus, WiMax, modem, a cellular network protocol, and the like, for communicating information to and/or from at least all the connected components, devices, and network in the computing environment 300. The network 350 may be any network or combination of networks including the Internet, local area networks, wide area networks, telephonic networks, cellular networks, satellite networks, and the like.

The computing device 305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The computing device 305 can be used to implement techniques, methods, applications, processes, or computer-executable instructions in some example computing environments. Computer-executable instructions can be retrieved from transitory media, and stored on and retrieved from non-transitory media. The executable instructions may originate from one or more of any programming, scripting, and machine languages (e.g., C, C++, C #, Java, Visual Basic, Python, Perl, JavaScript, and others).

The processor(s) 310 may execute under any operating system (OS) (not shown), in a native or virtual environment. One or more applications may be deployed that a include logic unit 360, an application programming interface (API) unit 365, an input unit 370, an output unit 375, and an inter-unit communication mechanism 395 for the different units to communicate with each other, with the OS, and with other applications (not shown). The described units and elements can be varied in design, function, configuration, or implementation and are not limited to the descriptions provided.

In some example implementations, when information or an execution instruction is received by the API unit 365, it may be communicated to one or more other units such as the logic unit 360, the input unit 370, and the output unit 375.

In some instances, the logic unit 360 may be configured to control the information flow among the units and direct the services provided by the API unit 365, the input unit 370, the output unit 375 in some example implementations described above. For example, the flow of one or more processes or implementations may be controlled by the logic unit 360 alone or in conjunction with the API unit 365.

Figure 4:
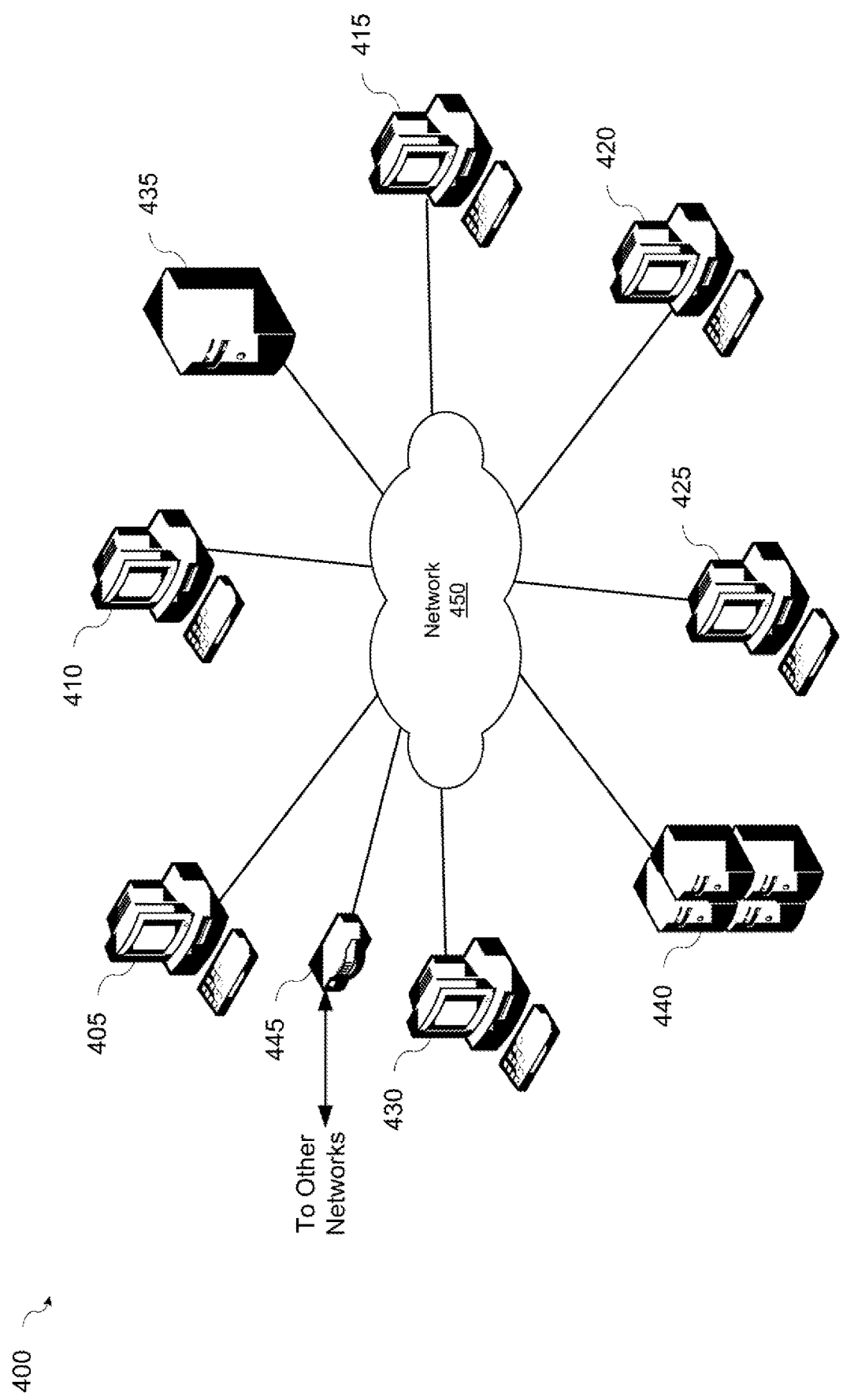
FIG. 4 is a diagram illustrating another example of a network environment for implementing a DLP program according to some aspects of the present disclosure.

FIG. 4 is a diagram illustrating an example of a network environment for implementing a DLP program according to some aspects of the present disclosure. Different environments may be used, as appropriate, to implement various embodiments. Referring to FIG. 4, the example network environment 400 may include computer systems 405-430, servers 435-440, one or more routers 445, as well as other devices (not shown) connected via network 450.

The computer systems 405-430 and servers 435-440 in the network environment 400 may include one or more processors, and these processors may include one or more processing cores. The computer systems 405-430 and servers 435-440 may also include memory and peripheral devices. In some implementations, the network environment 400 may include a router 445. The router 445 may provide a connection to other networks, for example, sub-networks (subnets), or Local Area Networks (LANs).

As described above with respect to FIGS. 1 and 3, either the classification module or the DLP program or both may be implemented on any or all of the computer systems 405-430 and servers 435-440 in the network environment 400. In various implementations, a computer system implementing the classification module may evaluate words or phrases in the content of the electronic communication to classify and categorize the electronic communication as containing sensitive information, and a computer system implementing the DLP program may detect the tag and block the electronic communication from being transmitted or permit the electronic communication to be transmitted as appropriate based on the tag information.

The methods of the present disclosure may be embodied on a non-transitory computer readable medium, for example, but not limited to, a memory of a computer system or server or other non-transitory computer readable medium known to those of skill in the art, having stored therein a program including computer executable instructions for making a processor, computer, or other programmable device execute the operations of the methods.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A computer-implemented method comprising:
evaluating, by a machine-learning model trained using historical electronic communications, content of an electronic communication that is attempted to be transmitted from a first network having a first security level by reading in the content to the machine-learning model, identifying by the machine-learning model a predetermined number of words or phrases or both in the content indicating that the electronic communication contains specific information that the machine-learning model is trained to recognize and a confidence score indicating a degree of confidence that the specific information is contained in the electronic communication;
determining that the specific information recognized by the machine-learning model contained in the electronic communication requires transmission on a network having at least the first security level;
tagging the electronic communication with tag information specifying a classification for at least the first security level indicating that the electronic communication contains the specific information recognized by the machine-learning model and including the confidence score;
determining whether the confidence score exceeds a predetermined threshold;
determining a security level of a second network for receiving the electronic communication; and
based on the tag information and in response to determining that the confidence score exceeds the predetermined threshold, blocking attempted transmission of the electronic communication from the first network to a second network when the second network has a second security level lower than the first security level.

2. The computer-implemented method of claim 1, further comprising:
identifying, by the machine-learning model, the specific information in the content of the electronic communication that is formatted in other than an identifiable standard format.

3. The computer-implemented method of claim 1, further comprising:
identifying, by the machine-learning model, specific words or specific phrases or both in the content of the electronic communication that are related to a particular category of information.

4. The computer-implemented method of claim 1, wherein the predetermined threshold for the confidence score is set based on a number of false positive indications that electronic communications contain the specific information determined to be acceptable.

5. The computer-implemented method of claim 1, wherein:
the machine-learning model comprises a set of machine-learning models, each machine-learning model in the set being trained to identify specific words or specific phrases or both in the content of the electronic communication that are related to a different category of information for which one of the set of machine-learning models is trained, and
the electronic communication is tagged with the tag information indicating that the electronic communication contains information in each different category for which the specific information is identified by the set of machine-learning models.

6. The computer-implemented method of claim 1, further comprising:
analyzing, by the machine-learning model, historical information to formulate types of sensitive information comprising the specific information, the historical information including information related to specified categories contained in stored emails, collaboration application communications, and text messages, wherein analyzing the historical information to formulate types of sensitive information comprising the specific information includes:

evaluating patterns of words and phrases in the historical information to identify types of information that have become sensitive based on current sensitive information;

identifying trends in the types of information contained in the historical information; and dynamically updating the specific information based on the identified trends and types of sensitive information from the historical information.

7. A system, comprising:

a first network having a first security level;

a plurality of first computing devices connected to the network and configured to transmit and receive electronic communications; and a second computing device connected to the network, the second computing device configured to:

execute a machine-learning model trained using historical communications to evaluate content of an electronic communication that is attempted to be transmitted from the first network having the first security level, wherein the content is evaluated by reading in the content to the machine-learning model, identifying by the machine-learning model a predetermined number of words or phrases or both in the content indicating that the electronic communication contains specific information that the machine-learning model is trained to recognize and a confidence score indicating a degree of confidence that the specific information is contained in the electronic communication;

determine that the specific information recognized by the machine-learning model contained in the electronic communication requires transmission on a network having at least the first security level;

tag the electronic communication with tag information specifying a classification for at least the first security level indicating that the electronic communication contains the specified information recognized by the machine-learning model, wherein the tag information includes the confidence score;

determine whether the confidence score exceeds a predetermined threshold;

determine a security level of a second network for receiving the electronic communication; and based on the tag information and in response to determining that the confidence score exceeds the predetermined threshold, block, by the second computing device, attempted transmission of the electronic communication from the first network to the second network when the second network as a second security level lower than the first security level.

8. The system of claim 7, wherein the machine-learning model is configured to identify the specific information in the content of the electronic communication that is formatted in other than an identifiable standard format.

9. The system of claim 7, wherein the machine-learning model is trainable to identify specific words or specific phrases or both in the content of the electronic communication that are related to a particular category of information.

10. The system of claim 7, wherein the predetermined threshold for the confidence score is set based on a number of false positive indications that electronic communications contain the specific information determined to be acceptable.

11. The system of claim 7, wherein the machine-learning model is further configured to:

analyze historical information including information related to specific categories contained in stored emails, collaboration application communications, and text messages, wherein analyzing the historical information to formulate types of sensitive information comprising the specific information includes:

evaluate patterns of words and phrases in the historical information to identify types of information that have become sensitive based on current sensitive information;

identify trends in the types of information contained in the historical information; and dynamically update the specific information based on the identified trends and types of sensitive information from the historical information.

12. The system of claim 7, the machine-learning model comprises a set of machine-learning models, each machine-learning model in the set being trained to identify specific words or specific phrases or both in the content of the electronic communication that are related to a different category of information for which one of the set of machine-learning models is trained, and the second computing device is configured to tag the electronic communication with the tag information indicating that the electronic communication contains information in each different category for which the specific information is identified by the set of machine-learning models.

13. A non-transitory computer readable medium having stored therein instructions that are executable by one or more processors to perform operations for preventing transmission of an electronic communication containing specific information, the operations including:

evaluating, by a machine-learning model trained using historical electronic communications, content of the electronic communication that is attempted to be transmitted from a first network having a first security level by reading in the content to the machine-learning model, identifying by the machine-learning model a predetermined number of words or phrases or both in the content indicating that the electronic communication contains specific information that the machine-learning model is trained to recognize and a confidence score indicating a degree of confidence that the specific information is contained in the electronic communication;

determining that the specific information recognized by the machine-learning model contained in the electronic communication requires transmission on a network having at least the first security level;

tagging the electronic communication with tag information specifying a classification for at least the first security level indicating that the electronic communication contains the specific information recognized by the machine-learning model and including the confidence score;

determining whether the confidence score exceeds a predetermined threshold;

determining a security level of a second network for receiving the electronic communication; and based on the tag information and in response to determining that the confidence score exceeds the predetermined threshold, blocking attempted transmission of the electronic communication from the first network to a second network when the second network has a second security level lower than the first security level.

14. The non-transitory computer readable medium of claim 13, further comprising instruction for performing operations including:
  identifying, by the machine-learning model, the specific information in the content of the electronic communication that is formatted in other than an identifiable standard format.

15. The non-transitory computer readable medium as defined in claim 13, further comprising instruction for performing operations including:
  identifying, by the machine-learning model, specific words or specific phrases or both in the content of the electronic communication that are related to a particular category of information.

16. The non-transitory computer readable medium as defined in claim 13,
  wherein the predetermined threshold for the confidence score is set based on a number of false positive indications that electronic communications contain the specific information determined to be acceptable.

17. The non-transitory computer readable medium as defined in claim 13, further comprising instruction for performing operations including:
  analyzing, by the machine-learning model, historical information to formulate types of sensitive information comprising the specific information, the historical information including information related to specified categories contained in stored emails, collaboration application communications, and text messages, wherein analyzing the historical information to formulate types of sensitive information comprising the specific information includes:
  evaluating patterns of words and phrases in the historical information to identify types of information that have become sensitive based on current sensitive information;
  identifying trends in the types of information contained in the historical information; and
  dynamically updating the specific information based on the identified trends and types of sensitive information from the historical information.

* * * * *